US008358636B2

(12) United States Patent
Bejerano et al.

(10) Patent No.: US 8,358,636 B2
(45) Date of Patent: Jan. 22, 2013

(54) METHODS AND DEVICES FOR SCHEDULING THE TRANSMISSION OF MULTICAST MESSAGES IN WIRELESS LOCAL AREA NETWORKS

(75) Inventors: Yigal Bejerano, Springfiled, NJ (US); Yihao Lisa Zhang, New Providence, NJ (US)

(73) Assignee: Alcatel Lucent, Paris (FR)

( * ) Notice: Subject to any disclaimer, the term of this patent is extended or adjusted under 35 U.S.C. 154(b) by 971 days.

(21) Appl. No.: 11/729,791

(22) Filed: Mar. 30, 2007

(65) Prior Publication Data

US 2008/0240019 A1  Oct. 2, 2008

(51) Int. Cl.
*H04W 4/00* (2009.01)
(52) U.S. Cl. ...... 370/338; 370/447; 370/328; 370/310.2
(58) Field of Classification Search .................. 370/338, 370/447, 328, 230, 310, 503
See application file for complete search history.

(56) References Cited

U.S. PATENT DOCUMENTS

| 2005/0190731 A1* | 9/2005 | Bejerano et al. | 370/338 |
|---|---|---|---|
| 2006/0067258 A1* | 3/2006 | Golestani et al. | 370/310 |
| 2008/0144493 A1* | 6/2008 | Yeh | 370/230 |

OTHER PUBLICATIONS

Marathe_Simple Heuristics for Unit Disk Graphs_Networks 25 59-68 1995.pdf.*
Khanna_EP0946073A2_pub.date_09 29 1999.pdf.*
M. R. Garey et al., *Computers and Intractability: A Guide to the Theory of NP-Completeness*, W.H. Freeman Publishing Company, 1979.
Y. Bejerano et al., *MiFi: A Framework for Fairness and QoS Assurance in Current IEEE 802.11 Networks with Multiple Access Points*, In Proc. IEEE INFOCOM, Mar. 2004.
T. Metke et al.; Method of Providing Reliable Broadcast and Multicast Over WLAN; IP. Com Journal, Dec. 2005, 4 pgs.

* cited by examiner

*Primary Examiner* — Olumide T Ajibade Akonai
*Assistant Examiner* — Alexander Yi
(74) *Attorney, Agent, or Firm* — Capital Patent & Trademark Law Firm, PLLC

(57) ABSTRACT

Real-time broadcast and multicast based packet transmissions/services over a wireless, local area networks (WLAN) may be improved by reducing the interference across neighboring access points (APs) while minimally impacting the performance of unicast transmissions/services. Minimal impact is assured by scheduling the transmission of multicast packet flows such that the duration of the time period required to transmit such flows is also minimized. One type of method provides a constant approximation of an optimal time period/schedule while another provides a logarithmic approximation of an optimal time period/schedule.

34 Claims, 4 Drawing Sheets

FIG. 2

| Symbol | Semantics |
|---|---|
| $A$ | The set of all access points (APs) |
| $U$ | The set of all users |
| $G(A,E)$ | The APs' interference graph |
| $N_a$ | AP a and all its interfering APs in G |
| $R$ | The set of supported bit-rate by the stations |
| $r_{a,u}$ | The wireless link bite rate between AP a and user u |
| $d_{a,u}$ | The required packet duration (in slots) for sending a decodable packet from AP a to user u |
| $D_a$ | The duration (in slots) of the packet transmitted by AP a |
| $D$ | The set of supported packet durations |
| $F$ | The number of supported multicast flows |
| $M_u$ | The set of multicast flows that user u listen |

FIG. 4

| 1 | 2 | 1 | 2 |
|---|---|---|---|
| 3 | 4 | 3 | 4 |
| 1 | 2 | 1 | 2 |
| 3 | 4 | 3 | 4 |

METHODS AND DEVICES FOR SCHEDULING THE TRANSMISSION OF MULTICAST MESSAGES IN WIRELESS LOCAL AREA NETWORKS

BACKGROUND OF THE INVENTION

The last few years have witnessed a growing number of large-scale installations of wireless, local area networks (WLANs). Although these large-scale WLANs can deliver packetized data via Internet connectivity and the like to individual users, efficient mechanisms for delivering data to groups of users is still lacking. Such mechanisms are critical to the distribution of live broadcasts as well as stored multimedia streams, radio channels and TV channels (i.e., multicasting).

Though it may appear at first glance that broadcast and multicast services can be easily supported by existing WLANs because each access point (AP) in a WLAN may send broadcast messages to all of its associated users, there exists a shortage of non-interfering frequencies in large-scale WLANs.

For instance, the widely-used 802.11 b/g standards only support three non-interfering frequencies. This means that adjacent APs in a WLAN often use the same transmission frequency. As a result, transmissions from such APs often interfere with one another. This significantly degrades the quality of any service that relies upon broadcast and multicast transmissions.

One possible solution is to send the message, etc., that is intended to be broadcast to each user individually (so-called "unicast" transmissions). However, such a solution does not exploit the broadcast capability of a wireless network and generates significant overhead.

It is desirable, therefore, to provide multicast-based methods and devices for large-scale WLANs that avoids or minimizes interference and avoids the need to generate a significant amount of overhead required.

It is further desirable to address two other challenges associated with large-scale WLANs. First, it is desirable to optimize the time allocated to APs (e.g., the shorter the better) when transmitting multicast packets in order to reduce the impact on unicast services. Second, it is desirable to properly schedule transmissions from neighboring stations, either APs or users, in order to minimize the amount of multicast packets that are lost due to interference.

SUMMARY OF THE INVENTION

The inventors have recognized that the desires stated above can be achieved through the use of novel association and non-association packet transmission, scheduling methods and associated devices. In accordance with the present invention, every user in a WLAN may receive packets/transmissions from any neighboring AP that uses the same frequency as its associated AP; not just from the AP that is associated with the user. The former is a non-association, packet scheduling transmission scheme while the latter is an association, packet scheduling transmission scheme.

One general type of an association scheme provided by the present invention involves a method that schedules the transmission of packets in a WLAN such that the time needed to send the packet from each AP in the WLAN to each associated user of an AP without interference is minimized.

More specifically, the present invention provides at least three association methods which may be implemented in a network operations center ("NOC") (i.e., in a device located at a NOC). In accordance with embodiments of the present invention, each of the three methods allocates slots within a so-called Contention Free Period ("CFP") (discussed below), during which time an AP may transmit multicast packets to users, such that the total time period of the CFP is within a certain factor (e.g., 12, 10, 5, etc.,) of an ideal, minimum time period required to transmit the packet(s) to every user within a WLAN without interference.

The present invention also provides non-association methods and related devices. In accordance with embodiments of the present invention, each of the non-association methods also schedules the transmission of packets in a WLAN such that the time needed to send the packet from each AP in the WLAN to each user without interference is minimized. In the non-association methods, however, the users need not be initially associated with an AP. Instead, they need only be within the transmission range of an AP.

Each of the non-association methods may include the following steps: (1) during each scheduling iteration, associating each user to an AP by, (i) determining an AP that can serve the most users within a specified time period; (ii) associating the determined AP with the users the AP can serve within the time period; (2) repeating steps (1)(i) and (ii) until each user is associated with an AP; and (3) allocating one or more time slots to each determined AP using an association process. The specific association process used may be selected from one of the three referred to above.

BRIEF DESCRIPTION OF THE DRAWINGS

FIG. 2 depicts a listing of abbreviations/notations and their associated meanings used throughout the discussion herein.

FIG. 4 illustrates the partitioning of a region of a WLAN containing APs into unit squares. Partitioning is used in some of the scheduling methods provided by the present invention.

DETAILED DESCRIPTION OF THE INVENTION, WITH EXAMPLES

Before presenting a discussion of the methods and devices of the present invention, we first present: (i) an overview of a typical IEEE 802.11-based WLAN that comprises multiple APs, and (ii) a discussion of a model, single-frequency WLAN.

Figure 1:
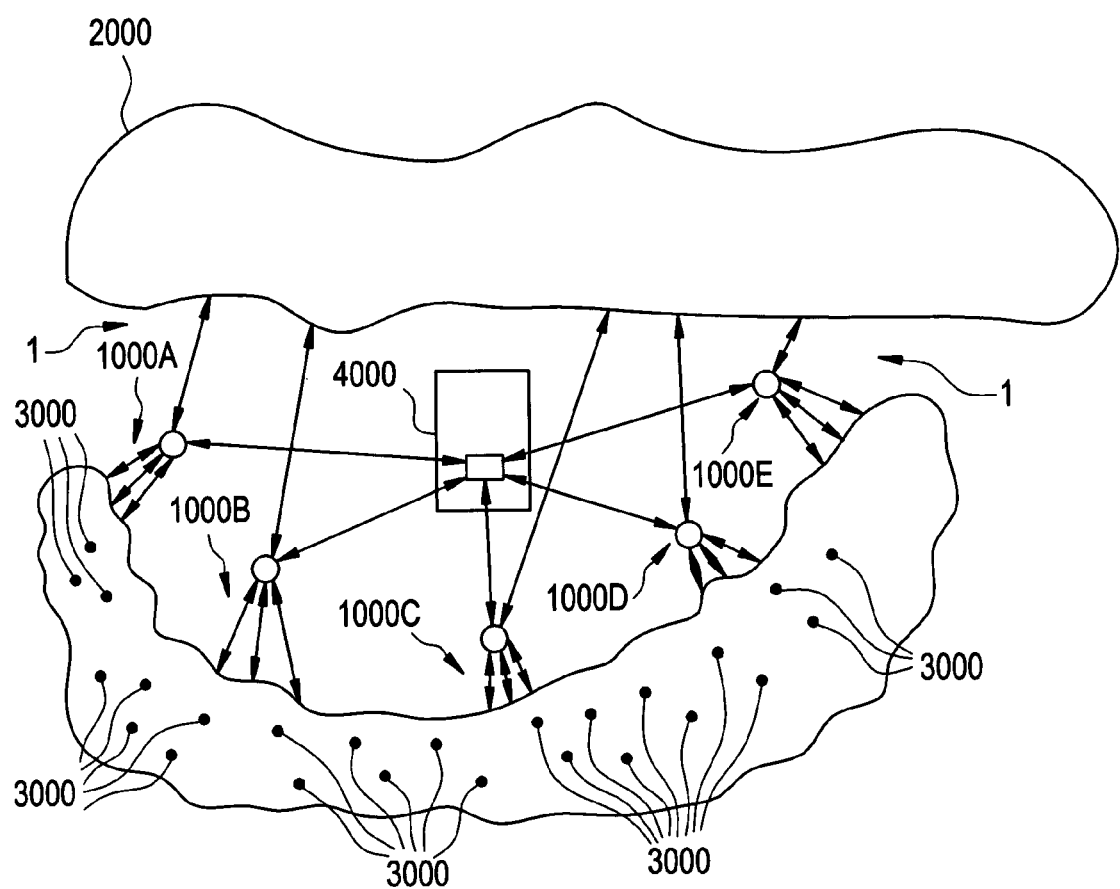
FIG. 1 depicts a simplified diagram of a WLAN used to illustrate exemplary features and functions of the present invention.

Referring to FIG. 1, within WLAN 1 there are APs 1000 *a-n* that are connected to a fixed, wired data network 2000 which may be the Internet. The APs 1000 *a-n* (where "n" is the last AP) may provide high speed connectivity between users 3000 and the network 2000. Moreover, the WLAN 1 may also contain a NOC 4000 that includes a device such as a network controller 4001 or the like which is responsible for coordinating the operation of each AP 1000 *a-n*. Further, each user 3000 within WLAN 1 is associated with a single AP 1000 *a-n* for sending and receiving unicast traffic.

In accordance with the present invention, APs may first be grouped according to their associated frequencies by the network controller 4001 or the like. That is, each AP or user that shares the same frequency is made a part of a distinct single-frequency-WLAN. After generating such single-frequency WLANs, a multicast scheme for each WLAN may be independently selected and implemented by the network controller 4001 or the like in conjunction with APs 1000*a-n* and users 3000*a-n*. In FIG. 1, for example, this means that the network controller 4001 is operable to associate each AP 1000 *a-n* with a single, shared frequency that is used to communicate with users residing within the transmission range of a given AP 1000 *a-n*. Thereafter, the network controller 4001 is operable to execute "association" and "non-association" based scheduling methods provided by the present invention to assure that the time needed to send the message from each AP in the WLAN to each associated, or initially unassociated, user of an AP without interference is minimized so that the effect on unicast transmissions is also minimized, for example.

Before describing the multicast schemes (i.e., methods and devices) provided by the present invention, we present a model of a single-frequency WLAN along with some terminology that may assist the reader in understanding the concepts discussed herein.

We begin by considering a single-frequency-WLAN model that comprises stations that share the same frequency, where a station may be either an AP or a mobile user. In this model A and U denote the sets of APs and users of the considered single-frequency-WLAN, respectively, and m=|A| and n=|U| denote the number of APs and users, correspondingly. In this model it will be assumed that the users have a quasi-static mobility pattern. In other words, though users are free to move from place to place, it is assumed that they tend to stay in the same physical location(s), relatively speaking, for long periods of time.

This model further assumes that all stations support both the Distributed Coordination Function (DCF) and the Point Coordination Function (PCF) defined by the IEEE 802.11 standard. Though currently the PCF mode is an optional part of the standard, the IEEE 802.11-E QoS Extension contains a mandatory contention free polling mechanism that broadens the PCF mode. In addition, this model assumes that a mobile device contains one or more applications (in hardware, software, firmware or some combination of the three) that: (a) allows an associated user to register in order to receive multicast services; and (b) provides a NOC/network controller with indications of the channel quality that the user experiences from each one of its adjacent APs.

In this model users and their associated APs may use a wide range of bit rates to carry out communications over a wireless channel depending on the condition of the channel. We denote by R={$r_1, \ldots, r_k$} all the supported bit rates. For each user-AP pair, u∈U and a∈A, let $r_{a,u}$∈R is denoted as the maximum possible bit rate between AP a and user u, (i.e., $r_{a,u}$ is the maximum bit rate such that user u can still decode packets sent by AP a). Essentially, the channel condition between an AP and a user varies in time. However, we assume that the selected bit-rate $r_{a,u}$ enables user u to decode the vast majority of the packets sent by AP a, given no interference from nearby stations.

We further assume that a network offers F multicast flows. For the sake of simplicity, we may also assume that the flows generate messages/packets of the same size and at a fixed rate, where $M_u$∈{1, . . . , F} represents the set of multicast flows requested by user u. It should be noted that the terms packet and message may be interchanged herein depending on the context of course.

In accordance with embodiments of the present invention, a particular transmission between a user and an AP may be divided into time slots where each packet to be transmitted requires an integer number of time slots. Accordingly, for each AP a∈A and each user u∈U in its transmission range: (a) the packet duration, $d_{a,u}$, may be defined as the minimum number of time slots required to transmit a packet with a bit rate of $r_{a,u}$, $D_a$=$max_u r_{a,u}$ the maximum number of time slots required for users associated with a, and F the set of supported packet durations. Any flow that generates messages/packets at a higher rate may be considered as several independent flows each of which generates messages/packets at a given fixed rate.

As noted above, because all of the APs within a single-frequency WLAN use the same frequency their transmissions may interfere with each other. Two APs may be considered to be interfering with one another when a packet sent by one of the APs may prevent a proper packet from being decoded in the vicinity of the other. In particular, we assume that two APs may interfere with one another when their transmission ranges overlap. These interference relationships may be represented by an interference graph G(A,E), where A is the set of APs and an edge (a,b)∈E represents every pair of interfering APs, a, b∈A. In addition, for each AP, a∈A we denote by $N_a$ its set of interfering APs and itself, i.e., $N_{a=\{a\} \cup \{a\}(a,a) \in E}$}. A summary of the main notations (and their meanings) used in the model just described and throughout the discussion herein is set forth in FIG. 2.

As mentioned above, a given transmission may be partitioned into repeated periods or superframes. Each superframe has a fixed duration and may include a CFP followed by a Contention Period (CP). In accordance with the present invention, multicast transmissions may be transmitted during CFPs without interference, while unicast transmissions may be transmitted during CPs. Each CFP starts with a beacon block (BB) in which all of the APs are synchronized such that they all transmit beacon signaling messages (i.e., not data) which indicate the beginning of a CFP, substantially simultaneously. The end of a CFP is indicated by an end block (EB), in which all of the APs send CF-end messages. The synchronization of CFPs eliminates interference that may result from the simultaneous transmission of packets from mobile users operating in DCF mode.

In more detail, each CFP may be divided into a number of time slots. The slots are efficiently allocated to APs in a WLAN such that interfering-APs are not allowed to transmit packets simultaneously. This reduces the amount of interference from adjacent APs. Thus, in this scheme a single multicast packet may be transmitted several times by different APs during different time slots. We refer to each such transmission as a packet.

Figure 3:
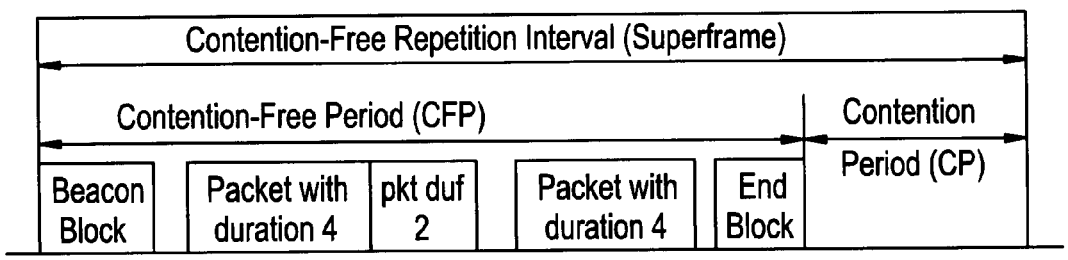
FIG. 3 depicts an example of a superframe during which time APs transmit packets to users in accordance with embodiments of the present invention.

A typical structure of a superframe is illustrated in FIG. 3. For the sake of simplicity, we assume in the rest of the discussion that follows that every multicast flow produces only one multicast packet/message for delivery during each CFP. More details concerning the use of CFPs and CPs may be found in U.S. patent application Ser. No. 10/788,460 assigned to the same assignee as the present application, the disclosure of which is incorporated by reference herein in full as if set forth in full herein.

Having presented a model, single-frequency WLAN above we now turn our discussion to the scheduling methods and devices provided by the present invention.

In order to minimize interference and reduce the amount of overhead required in scheduling multicast AP transmissions, the inventors developed two packet-scheduling strategies each of which may be executed in a number of ways by an NOC/network controller or the like. The first is an association-based multicast strategy which allows an AP a to send a single multicast packet to all of its associated users where the packet bit rate is the maximum bit-rate $r_a$ that can be decoded by all the associated users of AP a. In such a strategy it can be assumed that a minimum packet duration, $D_a$, may be decoded by all the associated users of a such that $D_a = \max_{u \in U_a} d_{a,u}$, where $U_a$ denotes the set of users associated with AP a.

The second strategy is a non-association multicast strategy that enables users to receive multicast packets from any AP, regardless of their associations. That is, a user may receive a multicast packet from any AP provided the user is within the transmission range of a given AP. This strategy is based on the broadcast characteristics of the shared wireless medium (e.g., shared frequency) where each user attempts to decode all transmitted packets. Packet scheduling in such a strategy needs to ensure that each user is able to decode at least one transmitted packet correctly. In other words, for each user u there is an AP that transmits the multicast packet with a bit-rate of $r_{a,u}$ or lower. Consequently, the packet duration of AP a is at least $d_{a,u}$.

More specifically, the methods (and associated devices) provided by the present invention approximate interference that each AP is subjected to using so-called "unit-disk interference graphs". Thereafter, the association-based methods provided by the present invention provide constant approximations of an optimal time period for transmitting multicast packets while the non-association based methods provide similar, but logarithmic approximations of an optimal time period.

In an ideal network, adjacent APs would use different frequencies. In such a network a user may only decode packets sent by its associated AP (i.e., the association-based strategy). However, the IEEE 802.11 b/g standards only support the use of three non-interfering frequencies. The result is that adjacent APs many times must share the same frequency. The non-association strategy (i.e., methods and devices) provided by the present invention utilizes this shortage to its advantage to improve system performance, as illustrated by the following example.

Consider a WLAN with three APs denoted by a, b, and c that may interfere with each others transmissions. Moreover, assume that the WLAN contains three pairs of users such that each pair is associated with a different AP. Assume further that in each pair, one user can decode packets transmitted at a high bit-rate within a single time slot, while the other requires two slots, and that each user can decode a packet sent by any AP within a packet duration of at least lx, where x is either 4 or 10 slots in this example.

Using an association-based strategy, each AP may send a single packet to all of its associated users. Thus, each AP requires two slots and the overall broadcast time is 6 slots.

Using a non-association based strategy, where users are given the ability to decode packets sent by one or more APs in their vicinity, rather than decoding packets sent only by their associated AP, when a single AP sends a packet with duration xl each of the users may decode the packet. When the number of slots is equal to four this is the most efficient way to broadcast the packets (assuming again, two users). When the number of slots is ten, a preferred schedule allows each AP to broadcast the packets to its associated users.

Not only did the inventors discover and develop two different strategies but they also completed comparisons of the two strategies. In doing so, the inventors developed sophisticated models which included many theorems and related proofs. Much of the discussion and presentation of these theorems and proofs has not been included herein for the sake of brevity and with the hope that its exclusion will make the discussion herein easier to understand. Further, these theorems and proofs are not needed to appreciate and practice the claimed inventions set forth herein.

The result of one of the inventors' theorems was the discovery that a solution to the multicast problem (i.e., minimizing interference and overhead) requires packet scheduling techniques that minimize the time required to service multicast flows. Further, the inventors discovered that a solution to the broadcast problem is a variant of the multicast problem where a single flow is supported by a WLAN. In addition, the inventors discovered that both the multicast and unicast problems can also be formulated as a variant of the broadcast problem. In brief, the inventors discovered this by completing a mapping of the multicast problem to the broadcast problem and by defining a new interference graph. In more detail, the new graph may be defined as follows. For each AP a let $U_a$ be the set of users that have association with a. For each $u \in U_a$ a virtual AP $a_u$ was created where virtual APs $\{a_u\} u \in U_a$ interfere with one another. In addition, if two APs a and b interfere with each other, then $a_u$ and $b_v$ are neighbors in the new graph for all $u \in U_a$ an $v \in U_b$. Because the both the unicast and multicast problems are a variant of the broadcast problem the inventors concentrated their efforts on discovering solutions to the broadcast problem. In particular, the inventors discovered novel methods for minimizing interference while reducing the amount of overhead required in multicast transmissions.

In accordance with the present invention, the inventors discovered approximation methods that may be used to solve the broadcast problem.

Suppose opt is the minimal CFP required by any scheduling method whose objective is to minimize a certain quantity (such as the broadcast problem). In accordance with the present invention, it can be said that an approximation method is one that returns "a-approximation" of value at most a·opt for every instance of the problem. On the other hand, we say a problem has no a-approximation when it is not possible to guarantee an a approximation for every instance of the problem.

In accordance with the present invention the inventors discovered that solutions to the broadcast and multicast problems are "NP hard". That is to say, both problems are not solvable within a polynomial time-period (i.e., a time period that can be determined with any degree of certainty; a reasonable time period). The proofs of this discovery have been omitted because they are not needed for an understanding of the claimed inventions. It should be noted that in arriving at their discovery the inventors did make use of the following property of a unit disk graph in obtaining approximation guarantees.

Figure 4:
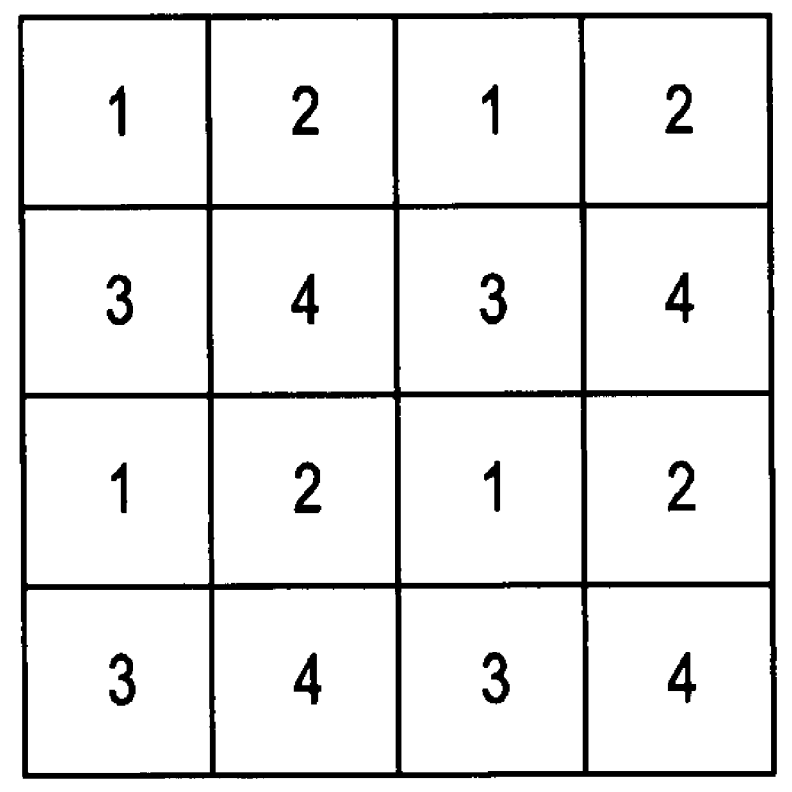

Suppose that APs form a unit-disk graph. In accordance with the present invention, the region containing the APs may be partitioned into unit squares and labeled 1, 2, 3 or 4 as shown in FIG. 4 where the dimensions of the squares coincides with the interference range of the unit disk interference graph. As a result: (a) at most three APs in each square can be mutually independent; and (b) two APs in two different squares with the same label do not interference each other.

The inventors took advantage of the unit disk assumption set forth above to guarantee good approximations. In accordance with the present invention the inventors discovered and developed three association-based approximation methods (discussed herein) that have approximation ratios of 12, 10 and 5 respectively (where a ratio indicates a given result is within a given factor, e.g., 12, 10, 5, of an ideal value).

More specifically, each technique may be used to develop a schedule for transmitting a packet or message in a WLAN such that the time needed to send the message/packets from each AP in the WLAN to each associated user of an AP without interference is minimized. Because the transmissions occur during a CFP, in effect the techniques represent a way of approximating the ideal, minimum CFP required to transmit the packet to every user within the WLAN without interference.

Before going further, it should be understood that, as briefly mentioned before, each of the scheduling/approximation methods provided by the present invention may be executed, implemented or otherwise completed by a network controller or the like with or without other known components. To complete each step of a given method of the present invention a network controller or the like may make use of hardware, software or firmware that is a part of the network controller and associated components.

Continuing, the first association-based method discovered by the inventors may be referred to as a method based on "tilting squares." In accordance with an embodiment of the present invention the first step in such a method may be the partitioning of a WLAN into subregions (e.g., unit squares), where each subregion has a predetermined dimension defined by a unit-disk, interference graph and contains one or more APs. Each square 1, 2, 3 or 4 may then be labeled using techniques known in the art.

After partitioning, the method then selects a first subregion and arbitrarily assigns each AP in the first subregion a position within an order (e.g., $1^{st}, 2^{nd}, 3^{rd}$, etc.,). After the APs are so-ordered, the method then sequentially allocates one or more time slots to each AP in the first subregion in accordance with the order ($1^{st}$ then $2^{nd}$ then $3^{rd}$, etc., . . . ,). In accordance with the present invention, the number of time slots allocated to each AP is sufficient to transmit the packet to every associated user of each AP within the first subregion.

After the first subregion is completed the method then moves on to the next subregion. More specifically, for a next subregion, the method arbitrarily assigns each AP in the next subregion a position within an order and then sequentially allocates one or more time slots to each AP in the next subregion in accordance with the order, where again the number of time slots allocated to each AP is sufficient to transmit the packet to every associated user of each AP within the next subregion and the first time slot allocated to an AP in the next subregion occurs after the last time slot allocated in a preceding region.

Thereafter, the steps set forth above are repeated for each remaining subregion. After the completion of the last subregion the first association method provided by the present invention ensures that the total time period of a CFP associated with all of the allocated time slots is within a factor of 12 of an ideal, minimum time period required to transmit the packet to every user within a WLAN without interference.

We now discuss two other methods provided by the present invention. In accordance with the present invention, in these methods, each user is associated with exactly one AP. For each AP a, recall $D_a = \max_u d_{a,u}$ is the maximum time slots required for users associated with a. Because each user can only be served by one AP, an AP has to be activated for $D_a$ consecutive slots at some point. Therefore, in developing these methods the inventors first formulated a generalized graph coloring problem where, using an interference graph, each node a was assigned $D_a$ consecutive colors, such that any two neighboring nodes did not share a common color. The objective was to minimize the total number of colors needed. The special case of $D_a = 1$ for all a, is the classic graph coloring problem.

In more detail, the inventors discovered a LongestDurationFirst (LDF) method and Smallest ColorFirst (SCF) method. As before in developing these methods the inventors made use of interference approximations based on using a unit-disk interference graph.

In accordance with an embodiment of the present invention, for each AP, the first step in an LDF method is to compute a duration time period needed to transmit the packet to each user associated with the AP. At substantially the same time the number of time slots associated with the computed time period is computed.

After these two values have been computed the LDF method of the present invention rounds up the number of computed time slots to the nearest $2^J$ time slots.

Thereafter, the LDF method next orders all of the APs in decreasing order from an AP that needs the largest number of $2^J$ time slots to an AP that needs the lowest number of $2^J$ time slots (where J is an integer), and then allocates available time slots to each AP in accordance with the order, wherein an available time slot is one that does not cause interference between the AP and its neighboring APs.

In this manner, each AP is allocated time slots. The LDF method ensures that a total time period of a CFP associated with all of the so-allocated time slots is within a factor of 10 of an ideal, minimum time period required to transmit the packet to every user within a WLAN that the APs belong to without interference.

The last association method is the SCF method. In accordance with yet another embodiment of the invention, the first step in the SCF method is, for each AP, to identify a time slot that is associated with the lowest indexed position within a CFP time frame that the given AP may transmit during without interference from its neighboring APs.

Once such a time slot is identified for each AP, the next step is to identify an AP, among all APs, whose identified time slot is also associated with a lowest indexed position from among all of the so-identified time slots. By indexing is meant, for example, that each slot within a CFP is given a number from lowest to highest, where the lowest number is given the lowest index and the highest number is given the highest index.

Once an AP is identified, the SCF method then allocates a number of time slots to the so-identified AP sufficient to enable it to transmit a packet to each of its associated users.

This process of identifying an AP and allocating time slots is repeated until each AP has been allocated time slots. The inventors discovered that the SCF scheduling method ensured that the total time period of a CFP associated with all allocated time slots was within a factor of 5 of an ideal, minimum time period required to transmit the packet to every user within a WLAN without interference.

In addition to discovering and developing association-based methods, the inventors also discovered and developed non-association based methods by, among other things, again making use of a unit disc graph as an interference graph in order to once gain approximate interference effects. In contrast to the association methods, the non-association methods attempt to schedule the transmission of packets from an AP to users that may not be initially associated with the AP but are nonetheless within the transmission range of the AP. As the reader may realize, this is more of a challenge, at least initially, than scheduling transmissions to already associated users.

In developing the non-association based methods the inventors viewed each AP as a set of users and aimed to schedule the transmission of a packet, and send the packet, to all users as quickly as possible.

In accordance with the present invention the inventors discovered both Heuristic and Non-Heuristic, non-association based methods for scheduling the transmission of packets from APs to users in a WLAN. We present the Heuristic approach first followed by the Non-Heuristic approaches.

The Heuristic method may be referred to as the "GreedySetCover Heuristic" or GreedySetCover (GreedySC) method. Though the inventors were not able to estimate or compute a total time period of a CFP associated with all allocated time slots as compared to an ideal, minimum time period (i.e., an approximation ratio) for this method, it appears to have favorable performance. Thus, it is worth discussing.

The inventors discovered this method based on their observation that the broadcast problem may be viewed as a combination of both a "set cover" and a "graph coloring" problem, where each problem may be solved in separate steps. During the first step, the method addresses the set cover aspect of the broadcast problem.

In accordance with the present invention, the first step involves associating each user with exactly one AP as follows. Initially, every user is not associated. The method greedily picks APs one at a time with the goal of sending a message to the most, as yet unassociated users as possible. In particular, for given duration d and AP a, let $X_{a,d}$ be the set of unassociated users that can be served by a, using at most time slots. The heuristic chooses a (a*, d*) pair that minimizes $d/|X_{a,d}|$, i.e., (a*, d*)=arg $\min_{a,d} d/|X_{a,d}|$.

By the end of the first step, every user in $X_{a^*,d^*}$ is associated with AP a* (i.e., every user is associated with one AP).

In the second step of the method, the graph coloring aspects are addressed. In sum, the method generates a transmission schedule that determines when packets can be transmitted using one of the association-based methods discussed above.

An alternative way of explaining the Heuristic, non-association method is as follows. In an exemplary first step each user is associated with an AP during a given scheduling iteration by: (i) determining an AP that can serve the most users within a specified transmission-duration time period; and (ii) associating the determined AP with the users the AP can serve within the duration time period.

After the first set of users is assigned to the first AP steps (i) and (ii) are repeated until each user is associated with an AP. Once all of the formerly unassociated users are now associated with an AP, one or more time slots is then allocated to each determined AP using one or more of the association methods discussed before.

As mentioned above this method requires users to become associated with APs. In accordance with the present invention, either one of the three association methods described previously above may be used to do so (e.g., tilting squares, LDF or SCF).

Turning now to the Non-Heuristic, non-association methods provided by the present invention, in accordance with additional embodiments of the invention the inventors discovered such methods provide logarithmic approximation ratios. Each of the methods described subsequently share the following common framework.

Each works in iterations, and aims to send a packet from an AP to as many users as possible per time slot during each iteration. In particular, for iteration i each method tries all possible durations d∈D and picks an independent set S of APs for each d. For a given d and S the set of users that can be served in this iteration are those u whose required packet duration $d_{u,a}$ is at most d for some a∈S. Each method uses a different process to pick an independent set. However, each method always chooses the duration of $d^i$ and independent set $S^i$ that minimizes the ratio of d to the number of users served during iteration i, which is equivalent to maximizing the number of new users served per time slot.

An alternative way of explaining the Non-Heuristic methods is as follows.

Initially, each method selects a transmission-duration time period and an independent set of non-interfering APs. Thereafter, each AP within the selected set is associated to those users each can serve within the selected time period. After such associations have been completed, the next set of non-interfering APs is selected and the process is repeated. This cycle of selecting a next set of APs and associating users continues until every user in the WLAN formed by the APs has been associated with at least one AP. After this has occurred each of the methods then allocates one or more time slots to each AP using an association process.

The reader may note that each of these methods includes, as a preliminary step, the selection of an independent set of non-interfering APs. This selection may be carried out in a number of different ways, a few of which are set forth below. In accordance with the present invention, the approximation ratio resulting from method depends on the way in which the independent sets are selected.

For example, one method of selecting an independent set of non-interfering APs may be referred to as a GreedyIndependentSet (GIS) method because it "greedily" (in the mathematical sense) identifies an AP, independent from among those APs that have already been chosen, such that the maximum number of users may be sent a packet.

This method selects an independent set of non-interfering APs by selecting an AP that can serve the most users within a fixed, transmission-duration time period, and eliminating those neighboring APs of the selected AP that may interfere with the selected AP during the same fixed, transmission-duration time period. After the first independent set is selected the process of associating users to APs and allocating slots to APs may proceed as described previously.

Thereafter, this method selects a next, independent set of non-interfering APs that can serve the next most users within the fixed, transmission-duration time period while eliminating those neighboring APs of the selected next AP that may interfere with the selected AP.

Based on detailed proofs and theorems the inventors discovered that this method ensured that the total time period of a CFP associated with all allocated time slots was within a factor of 5 of an ideal, minimum time period required to transmit the packet to every user within a WLAN without interference for a maximum independent set (e.g., a set that includes a maximum number of nodes such that any pair of nodes do not interfere with each other).

Further, the inventors discovered that using a unit-disk interference graph, the GreedyIS method ensured that the total time period of a CFP associated with all allocated time slots was within a factor of $5H_n$=O(log n) of an ideal, minimum time period required to transmit the packet to every user within a WLAN without interference.

Another example of a way in which the independent sets of non-interfering APs may be selected is referred to as TiltingSquareIS (TSIS). Like its' association-based cousin, this method may be described as partitioning a region of APs into unit squares and labelling each square 1, 2, 3 or 4 as shown in FIG. 4. As before, the method enumerates all possible subsets of APs of size 1, 2 and 3 within each square and computes the number of users that can be sent a packet by each subset. The method then chooses, for each square, the subset of APs that are involved in sending the packet to the most number of users. Because any two APs in two different squares with the same label may not interfere with each other, the chosen subsets in all squares labeled 1 form an independent set. The same statement holds for labels 2, 3 and 4. The method then chooses the best label.

This method can also be described as follows. Initially, the method partitions a WLAN into subregions (i.e., squares), each subregion having a pre-determined dimension defined by a unit-disk, interference graph and containing one or more APs. Thereafter, the method identifies the subregion that serves the most users within a specified transmission-duration time period. After a first subregion is selected the method proceeds to select the next set of non-interfering APs by, similarly, identifying the next subregion that serves the next most users within the specified transmission-duration time period.

Through proofs and theorems the inventors discovered that the TilingSquareIS method ensures that the total time period of a CFP associated with all allocated time slots was within a factor of 4 of an ideal, minimum time period required to transmit the packet to every user within a WLAN without interference (i.e., provides an approximation ratio p=4) for a maximum independent set. Further, when the APs selected initially form a unit-disk interference graph, the TilingSquareIS method ensures that the total time period of a CFP associated with all allocated time slots was within a factor of $4H_n = O(\log n)$ of an ideal, minimum time period required to transmit the packet to every user within a WLAN without interference.

Though the discussion above sets forth some examples of the present invention, it is practical impossible to set forth all of them. The scope of the present invention is, therefore, set forth in the claims that follow.

We claim:

1. A method for scheduling the transmission of a multicast data packet in a wireless, local area network (WLAN) comprising:
   scheduling using a unit-disk, interference graph, which defines predetermined dimensions of WLAN partitioned square subregions coinciding with an interference range of the graph, to provide constant approximations of an optimal time period for the transmission of a multicast data packet by,
   minimizing the time needed to send the multicast data packet from an access point (AP) in the WLAN to each user over allocated time slots without interference and over a frequency used by another AP,
   wherein the use of the unit-disk, interference graph provides an approximation guarantee of obtaining an approximation ratio of one of 12, 10, and 5 which indicates that, a total time period of a CFP (Contention Free Period) associated with all allocated time slots is no more than a factor of one of 12, 10, and 5, respectively, of an ideal, minimum time period required to transmit the multicast data packet to every user within the WLAN without interference over a frequency used by another AP;
   and wherein the partitioned square subregions contain one or more labeled access points (APs).

2. The method as in claim 1 further comprising:
   (a) partitioning the WLAN into square subregions, each subregion having a pre-determined dimension defined by a unit-disk, interference graph and containing one or more APs;
   (b) for a first subregion, arbitrarily assigning each AP in the first subregion a position within an order and then sequentially allocating one or more time slots to each AP in the first subregion in accordance with the order, the number of time slots allocated to each AP being sufficient to transmit the multicast data packet to every associated user of each AP within the first subregion,
   (c) for a next subregion, arbitrarily assigning each AP in the next subregion a position within an order and then sequentially allocating one or more time slots to each AP in the next subregion in accordance with the order, the number of time slots allocated to each AP being sufficient to transmit the multicast data packet to every associated user of each AP within the next subregion,
   wherein the first time slot allocated to an AP in the next subregion occurs after the last time slot allocated in a preceding region, and
   (d) repeating step (c) for each, next subregion,
   wherein a total time period of a contention free period (CFP) associated with all allocated time slots is within a factor of 12 of an ideal, minimum time period required to transmit the multicast data packet to every user within the WLAN without interference.

3. The method as in claim 2 further comprising:
   (a) for each AP,
   (i) computing a time period needed to transmit the multicast data packet to each user associated with the AP;
   (ii) computing a number of needed time slots associated with the computed time period; and
   (iii) rounding up the number of computed time slots to the nearest $2^j$ time slots; and
   (b) taking all of the APs together,
   (i) ordering the APs in decreasing order from an AP that needs the largest number of $2^j$ time slots to an AP that needs the lowest number of $2^j$ time slots; and
   (ii) allocating available time slots to each AP in accordance with the order, wherein an available time slot is one that does not cause interference between the AP and its neighboring APs,
   wherein a total time period of a contention free period (CFP) associated with all allocated time slots is within a factor of 10 of an ideal, minimum time period required to transmit the multicast data packet to every user within the WLAN without interference.

4. The method as in claim 1 further comprising:
   (a) for each AP, identifying a time slot that is associated with the lowest indexed position within a Contention Free Period (CFP) time frame that the AP may transmit during without interference from neighboring APs;
   (b) taking all of the APs together,
   (i) identifying an AP whose identified time slot is also associated with a lowest indexed position from among all of the so-identified time slots,
   (ii) allocating a number of time slots to the so-identified AP sufficient to enable the AP to transmit the multicast data packet to each user associated with the AP; and
   (c) repeating steps (a) and (b) until each AP has been allocated time slots,
   wherein a total time period of a contention free period (CFP) associated with all allocated time slots is within a factor of 5 of an ideal, minimum time period required to transmit the multicast data packet to every user within the WLAN without interference.

5. A method for scheduling the transmission of a multicast data packet in a wireless, local area network (WLAN) to minimize the time needed to send the multicast data packet from an access point (AP) in the WLAN to each user within transmission range of the AP without interference comprising:
   scheduling using a unit-disk, interference graph, which defines predetermined dimensions of WLAN partitioned square subregions coinciding with an interference range of the graph, to provide constant approximations of an optimal time period for the transmission of a multicast data packet by,
(1) during each scheduling iteration, associating each user to an AP by,
   (i) determining an AP that can serve the most users within a specified time period and over a frequency used by another AP;
   (ii) associating the determined AP with the users the AP can serve within the time period;
(2) repeating steps (1)(i) and (ii) until each user is associated with an AP; and
(3) allocating one or more time slots to each determined AP using an association process;
wherein the use of the unit-disk, interference graph provides an approximation guarantee of obtaining an approximation ratio of one of 12, 10, and 15 which indicates that, a total time period of a CFP (Contention Free Period) associated with all allocated time slots is no more than a factor of one of 12, 10, and 5, respectively, of an ideal, minimum time period required to transmit the multicast data packet to every user within the WLAN without interference over a frequency used by another AP;
and wherein the partitioned square subregions contain one or more labeled access points (APs).

6. The method as in claim 5 wherein the association process comprises:
(a) partitioning the WLAN into square subregions, each subregion having a pre-determined dimension defined by a unit-disk, interference graph and containing one or more APs;
(b) for a first subregion, arbitrarily assigning each AP in the first subregion a position within an order and then sequentially allocating one or more time slots to each AP in the first subregion in accordance with the order, the number of time slots allocated to each AP being sufficient to transmit the multicast data packet to every associated user of each AP within the first subregion,
(c) for a next subregion, arbitrarily assigning each AP in the next subregion a position within an order and then sequentially allocating one or more time slots to each AP in the next subregion in accordance with the order, the number of time slots allocated to each AP being sufficient to transmit the multicast data packet to every associated user of each AP within the next subregion,
wherein the first time slot allocated to an AP in the next subregion occurs after the last time slot allocated in a preceding region, and
(d) repeating step (c) for each, next subregion, wherein a total time period of a contention free period (CFP) associated with all allocated time slots is within a factor of 12 of an ideal, minimum time period required to transmit the multicast data packet to every user within the WLAN without interference.

7. The method as in claim 5 wherein the association process comprises:
(a) for each AP,
   (i) computing a time period needed to transmit the multicast data packet to each user associated with the AP;
   (ii) computing a number of needed time slots associated with the computed time period; and
   (iii) rounding up the number of computed time slots to the nearest $2^J$ time slots; and
(b) taking all of the APs together,
   (i) ordering the APs in decreasing order from an AP that needs the largest number of $2^J$ time slots to an AP that needs the lowest number of $2^J$ time slots; and
   (ii) allocating available time slots to each AP in accordance with the order, wherein an available time slot is one that does not cause interference between the AP and its neighboring APs,
wherein a total time period of a contention free period (CFP) associated with all allocated time slots is within a factor of 10 of an ideal, minimum time period required to transmit the multicast data packet to every user within the WLAN without interference.

8. The method as in claim 5 wherein the association process comprises:
(a) for each AP, identifying a time slot that is associated with the lowest indexed position within a Contention Free Period (CFP) time frame that the AP may transmit during without interference from neighboring APs;
(b) taking all of the APs together,
   (i) identifying an AP whose identified time slot is also associated with a lowest indexed position from among all of the so-identified time slots,
   (ii) allocating a number of time slots to the so-identified AP sufficient to enable the AP to transmit the multicast data packet to each user associated with the AP; and
(c) repeating steps (a) and (b) until each AP has been allocated time slots,
wherein a total time period of a contention free period (CFP) associated with all allocated time slots is within a factor of 5 of an ideal, minimum time period required to transmit the multicast data packet to every user within the WLAN without interference.

9. A method for scheduling the transmission of a multicast data packet in a wireless, local area network (WLAN) to minimize the time needed to send the multicast data packet from an access point (AP) in the WLAN to each user within transmission range of the AP without interference comprising:
scheduling using a unit-disk, interference graph, which defines predetermined dimensions of WLAN partitioned square subregions coinciding with an interference range of the graph, to provide constant approximations of an optimal time period for the transmission of the multicast data packet by,
(1) selecting a time period;
(2) selecting an independent set of non-interfering APs;
(3) associating each AP within the selected set to those users each can serve within the selected time period and over a frequency used by other APs;
(4) selecting the next set of non-interfering APs and repeating steps (1) through (3);
(5) repeat step (4) until every user in the WLAN has been associated with at least one AP; and
(6) allocating one or more time slots to each AP using an association process;
wherein the use of the unit-disk, interference graph provides an approximation guarantee of obtaining an approximation ratio of one of 12, 10, and 5 which indicates that, a total time period of a CFP (Contention Free Period) associated with all allocated time slots is no more than a factor of one of 12, 10, and 5, respectively, of an ideal, minimum time period required to transmit the multicast data packet to every user within the WLAN without interference over a frequency used by another AP;
and wherein the partitioned square subregions contain one or more labeled access points (APs).

10. The method as in claim 9 wherein the selection of the independent set of APs comprises:
for a fixed time period,
(a) selecting an AP that can serve the most users within the fixed time period; and
(b) eliminating those neighboring APs of the selected AP that may interfere with the selected AP.

11. The method as in claim 9 wherein the selection of the next set of non-interfering APs comprises:
(a) selecting the next AP that can serve the next most users within the fixed time period;
(b) eliminate those neighboring APs of the selected next AP that may interfere with the selected AP.

12. The method of claim 10 wherein a total time period of a contention free period (CFP) associated with all allocated time slots is within a factor of 5 of an ideal, minimum time period required to transmit the multicast data packet to every user within a WLAN without interference.

13. The method of claim 10 wherein a total time period of a contention free period (CFP) associated with all allocated time slots is within a factor of 5Hn=O(log n) of an ideal, minimum time period required to transmit the multicast data packet to every user within a WLAN without interference.

14. The method as in claim 9 wherein the selection of the independent set comprises:
(a) partitioning the WLAN into square subregions, each subregion having a pre-determined dimension defined by a unit-disk, interference graph and containing one or more APs;
(b) identifying the subregion that serves the most users within a specified time period.

15. The method as in claim 9 wherein the selection of the next set of non-interfering APs further comprises identifying the next subregion that serves the next most users within the specified time period.

16. The method as in claim 14 wherein a total time period of a contention free period (CFP) associated with all allocated time slots was within a factor of 4 of an ideal, minimum time period required to transmit the multicast data packet to every user within a WLAN without interference.

17. The method as in claim 14 wherein a total time period of a contention free period (CFP) associated with all allocated time slots was within a factor of 4Hn=O(log n) of an ideal, minimum time period required to transmit the multicast data packet to every user within a WLAN without interference.

18. A device for scheduling the transmission of a multicast data packet in a wireless, local area network (WLAN), the device operable to:
schedule using a unit-disk, interference graph, which defines predetermined dimensions of WLAN partitioned square subregions coinciding with an interference range of the graph, to provide constant approximations of an optimal time period for a transmission of a multicast data packet by minimizing a time needed to send the multicast data packet from an access point (AP) in the WLAN to each user over allocated time slots without interference and over a frequency used by another AP,
wherein the use of the unit-disk, interference graph provides an approximation guarantee of obtaining an approximation ratio of one of 12, 10, and 5 which indicates that a total time period of a CFP (Contention Free Period) associated with all allocated time slots is no more than a factor of one of 12, 10, and 5, respectively, of an ideal, minimum time period required to transmit the multicast data packet to every user within the WLAN without interference;
and wherein the partitioned square subregions contain one or more labeled access points (APs).

19. The device as in claim 18 further operable to schedule the transmission of the multicast data packet by:
(a) partitioning the WLAN into square subregions, each subregion having a pre-determined dimension defined by a unit-disk, interference graph and containing one or more APs;
(b) for a first subregion, arbitrarily assigning each AP in the first subregion a position within an order and then sequentially allocating one or more time slots to each AP in the first subregion in accordance with the order, the number of time slots allocated to each AP being sufficient to transmit the multicast data packet to every associated user of each AP within the first subregion,
(c) for a next subregion, arbitrarily assigning each AP in the next subregion a position within an order and then sequentially allocating one or more time slots to each AP in the next subregion in accordance with the order, the number of time slots allocated to each AP being sufficient to transmit the multicast data packet to every associated user of each AP within the next subregion,
wherein the first time slot allocated to an AP in the next subregion occurs after the last time slot allocated in a preceding region, and
(d) repeating step (c) for each, next subregion,
wherein a total time period of a contention free period (CFP) associated with all allocated time slots is within a factor of 12 of an ideal, minimum time period required to transmit the multicast data packet to every user within the WLAN without interference.

20. The device as in claim 18 further operable to schedule the transmission of the multicast data packet by:
(a) for each AP,
(i) computing a time period needed to transmit the multicast data packet to each user associated with the AP;
(ii) computing a number of needed time slots associated with the computed time period; and
(iii) rounding up the number of computed time slots to the nearest $2^J$ time slots; and
(b) taking all of the APs together,
(i) ordering the APs in decreasing order from an AP that needs the largest number of $2^J$ time slots to an AP that needs the lowest number of $2^J$ time slots; and
(ii) allocating available time slots to each AP in accordance with the order, wherein an available time slot is one that does not cause interference between the AP and its neighboring APs,
wherein a total time period of a contention free period (CFP) associated with all allocated time slots is within a factor of 10 of an ideal, minimum time period required to transmit the multicast data packet to every user within the WLAN without interference.

21. The device as in claim 18 further operable to schedule the transmission of the multicast data packet by:
(a) for each AP, identifying a time slot that is associated with the lowest indexed position within a Contention Free Period (CFP) time frame that the AP may transmit during without interference from neighboring APs;
(b) taking all of the APs together,
(i) identifying an AP whose identified time slot is also associated with a lowest indexed position from among all of the so-identified time slots,
(ii) allocating a number of time slots to the so-identified AP sufficient to enable the AP to transmit the multicast data packet to each user associated with the AP; and (c) repeating steps (a) and (b) until each AP has been allocated time slots, wherein a total time period of a contention free period (CFP) associated with all allocated time slots is within a factor of 5 of an ideal, minimum time period required to transmit the multicast data packet to every user within the WLAN without interference.

22. A device for scheduling the transmission of a multicast data packet in a wireless, local area network (WLAN) to minimize the time needed to send the multicast data packet from an access point (AP) in the WLAN to each user within transmission range of an AP without interference, the device operable to:

Schedule using a unit-disk, interference graph, which defines predetermined dimensions of WLAN partitioned square subregions coinciding with an interference range of the graph, to provide constant approximations of an optimal time period for a transmission of a multicast data packet by,
(1) during each scheduling iteration, associate each user to an AP by,
(i) determining an AP that can serve the most users within a specified time period and over a frequency used by another AP;
(ii) associating the determined AP with the users the AP can serve within the time period;
(2) repeating steps (1)(i) and (ii) until each user is associated with an AP; and
(3) allocating one or more time slots to each determined AP using an association process;
wherein the use of the unit-disk, interference graph provides an approximation guarantee of obtaining an approximation ratio of one of 12, 10, and 5 which indicates that, a total time period of a CFP (Contention Free Period) associated with all allocated time slots is no more than a factor of one of 12, 10, and 5, respectively, of an ideal, minimum time period required to transmit the multicast data packet to every user within the WLAN without interference over a frequency used by another AP;
and wherein the partitioned square subregions contain one or more labeled access points (APs).

23. The device as in claim 22 further operable to schedule the transmission of the multicast data packet by:
(a) partitioning the WLAN into square subregions each subregion having a pre-determined dimension defined by a unit-disk, interference graph and containing one or more APs;
(b) for a first subregion, arbitrarily assigning each AP in the first subregion a position within an order and then sequentially allocating one or more time slots to each AP in the first subregion in accordance with the order, the number of time slots allocated to each AP being sufficient to transmit the multicast data packet to every associated user of each AP within the first subregion,
(c) for a next subregion, arbitrarily assigning each AP in the next subregion a position within an order and then sequentially allocating one or more time slots to each AP in the next subregion in accordance with the order, the number of time slots allocated to each AP being sufficient to transmit the multicast data packet to every associated user of each AP within the next subregion,
wherein the first time slot allocated to an AP in the next subregion occurs after the last time slot allocated in a preceding region, and
(d) repeating step (c) for each, next subregion, wherein a total time period of a contention free period (CFP) associated with all allocated time slots is within a factor of 12 of an ideal, minimum time period required to transmit the multicast data packet to every user within the WLAN without interference.

24. The device as in claim 22 further operable to schedule the transmission of the multicast data packet by:
(a) for each AP,
(i) computing a time period needed to transmit the multicast data packet to each user associated with the AP;
(ii) computing a number of needed time slots associated with the computed time period; and
(iii) rounding up the number of computed time slots to the nearest $2^j$ time slots; and
(b) taking all of the APs together,
(i) ordering the APs in decreasing order from an AP that needs the largest number of $2^j$ time slots to an AP that needs the lowest number of $2^j$ time slots; and
(ii) allocating available time slots to each AP in accordance with the order, wherein an available time slot is one that does not cause interference between the AP and its neighboring APs,
wherein a total time period of a contention free period (CFP) associated with all allocated time slots is within a factor of 10 of an ideal, minimum time period required to transmit the multicast data packet to every user within the WLAN without interference.

25. The device as in claim 22 further operable to schedule the transmission of the multicast data packet by:
(a) for each AP, identifying a time slot that is associated with the lowest indexed position within a Contention Free Period (CFP) time frame that the AP may transmit during without interference from neighboring APs;
(b) taking all of the APs together,
(i) identifying an AP whose identified time slot is also associated with a lowest indexed position from among all of the so-identified time slots,
(ii) allocating a number of time slots to the so-identified AP sufficient to enable the AP to transmit the multicast data packet to each user associated with the AP; and
(c) repeating steps (a) and (b) until each AP has been allocated time slots,
wherein a total time period of a contention free period (CFP) associated with all allocated time slots is within a factor of 5 of an ideal, minimum time period required to transmit the multicast data packet to every user within the WLAN without interference.

26. A device for scheduling the transmission of a multicast data packet in a wireless, local area network (WLAN) to minimize the time needed to send the multicast data packet from an access point (AP) in the WLAN to each user within transmission range of an AP without interference, the device operable to:
schedule using a unit-disk, interference graph, which defines predetermined dimensions of WLAN partitioned square subregions coinciding with an interference range of the graph, to provide constant approximations of an optimal time period for a transmission of a multicast data packet by, selecting a time period;
(1) selecting an independent set of non-interfering APs;
(2) associating each AP within the selected set to those users each can serve within the selected time period and over a frequency used by other APs;
(3) selecting the next set of non-interfering APs and repeat steps (1) through (3);

(4) repeating step (4) until every user in the WLAN has been associated with at least one AP; and (5) allocating one or more time slots to each AP using an association process;

wherein the use of the unit-disk, interference graph provides an approximation guarantee of obtaining an approximation ratio of one of 12, 10, and 5 which indicates that, a total time period of a CFP (Contention Free Period) associated with all allocated time slots is no more than a factor of one of 12, 10, and 5, respectively, of an ideal, minimum time period required to transmit the multicast data packet to every user within the WLAN without interference over a frequency used by another AP;

and wherein the partitioned square subregions contain one or more labeled access points (APs).

27. The device as in claim 26 further operable to schedule the transmission of the multicast data packet by:
for a fixed time period,
(c) selecting an AP that can serve the most users within the fixed time period; and
(d) eliminating those neighboring APs of the selected AP that may interfere with the selected AP.

28. The device as in claim 26 further operable to schedule the transmission of the multicast data packet by:
(a) selecting the next AP that can serve the next most users within the fixed time period;
(b) eliminating those neighboring APs of the selected next AP that may interfere with the selected AP.

29. The device as in claim 27 wherein a total time period of a contention free period (CFP) associated with all allocated time slots is within a factor of 5 of an ideal, minimum time period required to transmit the multicast data packet to every user within a WLAN without interference.

30. The device as in claim 27 wherein a total time period of a contention free period (CFP) associated with all allocated time slots is within a factor of 5Hn=O(log n) of an ideal, minimum time period required to transmit the multicast data packet to every user within a WLAN without interference.

31. The device as in claim 26 further operable to schedule the transmission of the multicast data packet by:
(c) partitioning the WLAN into square subregions, each subregion having a pre-determined dimension defined by a unit-disk, interference graph and containing one or more APs;
(d) identifying the subregion that serves the most users within a specified time period.

32. The device as in claim 26 further operable to schedule the transmission of the multicast data packet by identifying the next subregion that serves the next most users within the specified time period.

33. The device as in claim 31 wherein a total time period of a contention free period (CFP) associated with all allocated time slots was within a factor of 4 of an ideal, minimum time period required to transmit the multicast data packet to every user within a WLAN without interference.

34. The device as in claim 31 wherein a total time period of a contention free period (CFP) associated with all allocated time slots was within a factor of 4Hn=O(log n) of an ideal, minimum time period required to transmit the multicast data packet to every user within a WLAN without interference.

* * * * *